United States Patent [19]

Nakano et al.

[11] 3,803,553

[45] Apr. 9, 1974

[54] CHARACTER RECOGNITION APPARATUS

[75] Inventors: Yasuaki Nakano, Hino; Kazuo Nakata, Kokubunji, both of Japan

[73] Assignee: Hitachi, Ltd., Tokyo, Japan

[22] Filed: June 14, 1972

[21] Appl. No.: 262,507

[52] U.S. Cl. .................... 340/146.3 F, 340/146.3 D

[51] Int. Cl. .................... G06k 9/12

[58] Field of Search 340/146.3 R, 146.3 D, 146.3 F, 340/146.3 S

[56] References Cited

UNITED STATES PATENTS 3,381,274 4/1968 Quade et al. ................ 340/146.3 D

*Primary Examiner*—Thomas A. Robinson

*Attorney, Agent, or Firm*—Craig and Antonelli

[57] ABSTRACT

Character recognition apparatus wherein projection patterns obtained by projecting a density distribution of a printed or typed character on two orthogonally-intersecting axes are compared with a number of standard projection patterns obtained by a similar method and separately recorded, and the standard information at the highest degree of similarity is selected as the recognized character.

16 Claims, 16 Drawing Figures

| | |
|---|---|
| FIG. 10a | 医 |
| FIG. 10b | 価 |
| FIG. 10c | 富 |
| FIG. 10d | 喜 |

FIG. 11

| Input Characters | Standard Characters Arranged in the Order of Smaller Differnces from Inputs | | | | |
|---|---|---|---|---|---|
| 意 | 意 828 | 倉 4394 | 黄 5804 | 参 6072 | 章 6124 |
| 飲 | 飲 570 | 欲 2326 | 放 2968 | 数 3016 | 久 3156 |
| 塩 | 塩 1376 | 漁 4780 | 造 4839 | 徳 4932 | 席 5434 |
| 喜 | 富 4456 | 喜 5544 | 島 5972 | 豊 6300 | 事 7226 |
| 原 | 原 312 | 返 4914 | 係 5142 | 所 5162 | 思 5392 |
| 校 | 校 620 | 役 3110 | 投 3152 | 枝 3512 | 格 6374 |
| 料 | 料 1902 | 科 2356 | 耕 5360 | 折 6290 | 持 6570 |

CHARACTER RECOGNITION APPARATUS

BACKGROUND OF THE INVENTION

The present invention relates to pattern recognition apparatus, and more particularly to apparatus for recognizing typed or printed characters.

As character recognition apparatus, there have heretofore been provided a number of recognition apparatus based on the so-called pattern matching method in which the respective standard patterns of characters to be recognized are previously stored, the degrees of coincidence between an input character and the standard characters are calculated, and the standard character having the closest correlation is selected as the recognized result. Although such apparatus are effective in cases where the characters forming the objects of the recognition are of a small number, difficulties are encountered in obtaining an apparatus which discriminates all of the 1,000 – 2,000 characters daily used as Japanese characters. More specifically, since the number of times of calculating the degree of coincidence between the input character pattern and the standard character patterns is large, the period of recognition becomes very long, and the calculating means becomes extremely complicated. Moreover, since the standard patterns are two-dimensional, the amount of information becomes large, and the memory capacity for storing the standard patterns becomes massive, resulting in great expense and/or increase in the access time to a memory device. On account of such disadvantages, it has been very difficult to put such an apparatus into practical use. Furthermore, since a positional deviation is unavoidable in inputting the character pattern to the recognition apparatus, it is often necessary in order to correct it that either the input character or the standard character is moved in parallel in the vertical and horizontal directions so as to search for a position of the best coincidence. For this reason, a two-dimensional shift register is required, which has rendered the apparatus complicated.

SUMMARY OF THE INVENTION

It is accordingly a primary object of the present invention to simplify a circuit for calculating the degree of coincidence between an input character and a standard character in the character recognition apparatus operating according to the foregoing pattern match method.

Another object of the present invention is to reduce the memory capacity of standard characters stored in the apparatus.

Still another important object of the present invention is to provide recognition apparatus in which a movement for correcting the positional deviation of an input character can be easily performed.

In order to accomplish the above-mentioned objects, the present invention carries out recognition in such a way that the density distribution of a character is projected on at least two straight lines (or axes), for example, on the horizontal axis and the vertical axis, and the projection patterns obtained are one-dimensionally processed to find a character which has standard projection patterns most coincident with the projection patterns of the input character. In this case, the recognition may also be such that, using only a part of the projection pattern, preliminary recognition is conducted to find a small number of probable correct solution characters, and then the remaining projection pattern is jointly used for only the small number of probable characters, to collectively judge a character which has a standard pattern most coincident with the input pattern.

Accordingly, the character recognition apparatus of the present invention comprises:

1. means to project a density distribution of a pattern of an input character (a character to be recognized) on at least two straight lines (or axes) and to convert the projection patterns into electric signals, 2. a memory device to store predetermined standard characters, i.e., all the characters which the character recognition apparatus can recognize, in the form of standard projection patterns obtained by subjecting them to projections similar to the above projecting method, and 3. a signal processor and an output device with which the standard character projection patterns stored in said memory device are suitably read out, the pattern signals and the projection pattern signal of the input character are respectively compared, and a character corresponding to the standard character pattern of the highest degree of coincidence (or degree of similarity) between them is outputted as the recognized character.

It is accordingly possible with the present invention to reduce the amount of information concerning characters by the use of the projection patterns and to consequently reduce the memory capacity for the standard patterns. Since the amount of information concerning characters is reduced and the operation is additionally one-dimensional, the apparatus is remarkably simplified and the recognition speed can accordingly be raised. Furthermore, the movement of a character in the horizontal direction exerts no influence on the projection in the vertical direction, while the movement in the vertical direction exerts no influence on the projection in the horizontal direction. Therefore, the correction of the positional deviation of a character may be considered respectively independent for the two, horizontal and vertical directions, and it can be realized by the use of a conventional shift register, so that the apparatus is remarkably simplified.

The present invention accordingly attains good results when applied to cases of a number of characters, such as Chinese characters.

The above-mentioned and other features and objects of the present invention will become more apparent by reference to the following description taken in conjunction with the accompanying drawings.

BRIEF DESCRIPTION OF THE DRAWINGS

FIGS. 10*a* and 10*d* illustrate various Chinese characters; and

FIG. 11 illustrates a table of Chinese characters.

DESCRIPTION OF THE PREFERRED EMBODIMENTS

Figure 1A:
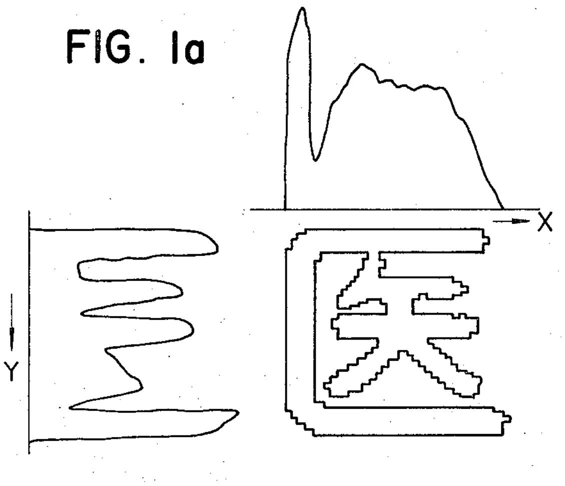
FIGS. 1*a* and 1*b* are diagrams showing examples of character patterns and projection patterns.
Figure 1B:
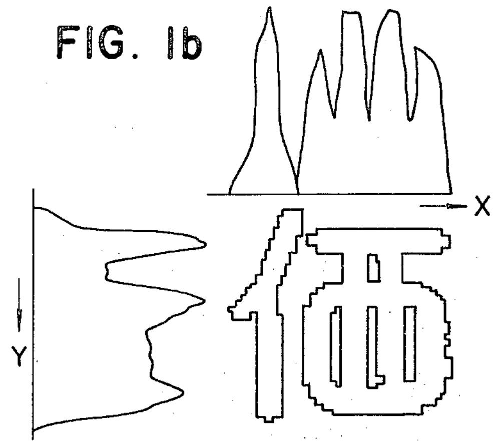

With reference to FIGS. 1*a* and 1*b*, the principle of the present invention will be described. FIGS. 1*a* and 1*b* show patterns in which, shown in FIGS. 10*a* and 10*b*, representing respective Chinese characters "medicine" in English and "value" in English, are decomposed into 50 meshes in both the horizontal direction and the vertical direction and in which the density of each of 50 × 50 = 2,500 elements in total is quantized into a binary digit, namely, 0 or 1. The figures also show profiles Y in which the quantized densities are projected on the vertical axis in parallel with the horizontal axis, and profiles X in which they are projected on the horizontal axis in parallel with the vertical axis. Accordingly, letting $A_{ij}$ be each mesh or element, $$A_{ij}=0 \text{ or } 1,\ 0\leqq i\leqq 50,\ 0\leqq j\leqq 50$$

By projecting the density distribution on the vertical axis in parallel with the horizontal axis, the following projection pattern is obtained:

$$Y_i=\sum_j A_{ij} \qquad (1)$$

*Y* is denominated the vertical projection pattern. Similarly, $$X_j=\sum_i A_{ij} \qquad (2)$$

is obtained, and is denominated the horizontal projection pattern. It is apparent from these equations that:

$$0\leqq X_i\leqq 50,\ 0\leqq Y_j\leqq 50 \qquad (3)$$

For convenience of explanation, description has been made above, and will be made below, of the case where the densities are projected on the horizontal and vertical axes. However, the lines along which they are projected need not always intersect orthogonally; for exmple, obliquely intersecting axes are also effective, especially for italic characters.

The assessment of coincidence, i.e., the degree of resemblance, between the projection patterns X as well as Y of an input character and standard patterns $X^s$ and $Y^s$ previously evaluated is obtained by appraising the sum among the absolute values of the differences of the respective elements, the sum of the squares of the differences, etc., on the basis of the difference, or by appraising the degree of similarity, such as the mutual correlation. In the following explanation, however, the sum of the squares of the differences of the respective elements is representatively used for simplicity of explanation.

Now, the distance between the projection pattern of an input character and that of a standard character is defined by:

$$R=R_X+R_Y \qquad (4)$$

$$R_X=\min_{|a|<c}\sum_j (X_{j+a}-X_j^s-m_X)^2 \qquad (5)$$

$$R_Y=\min_{|b|<c}\sum_i (Y_{i+b}-Y_i^s-m_Y)^2 \qquad (6)$$

where R denotes the distance between the characters, $R_X$ the distance between the horizontal projection patterns, and $R_Y$ the distance between the vertical projection patterns. $X^s_j (j = 1, 2 \ldots 50)$ represents the horizontal projection patterns of the standard character while $Y^s_i (i = 1, 2 \ldots 50)$ the vertical projection patterns of the standard character. When the constants $m_X$ and $m_Y$ are selected at the differences of the mean values of the projected patterns:

$$m_X=\bar{X}-\bar{X}^s =\frac{1}{50}\sum_j (X_j-X_j^s) \qquad (7)$$

$$m_Y=\bar{Y}-\bar{Y}^s =\frac{1}{50}\sum_i (Y_i-Y_i^s) \qquad (8)$$

good results are obtained, but these constants may be 0 for simplicity. Although, in the following description, the sum of the squares of the differences as defined by equations (4), (5) and (6) are adopted as the distances, any other form of distances may also be employed. In case of the distance, the more similar the characters are, the smaller the distance is.

In equations (5) and (6), the variables *a* and *b* are parameters representing movements of the characters, while the constant *c* indicates the upper limit of the movements. Equations (5) and (6) accordingly signify that the input character is moved within a certain range to find a position at which the distances $R_X$ and $R_Y$ become a minimum, and that values at the position are adopted as the distance representing a similarity.

For recognition of the characters, a standard character coinciding best with an input character may be looked for. The distance R from the input character is therefore evaluated for all the standard characters by equations (5), (6) and (7), and the standard character providing the least distance may be selected as the recognized result.

The present invention will now be described in conjunction with the preferred embodiments.

Figure 2:
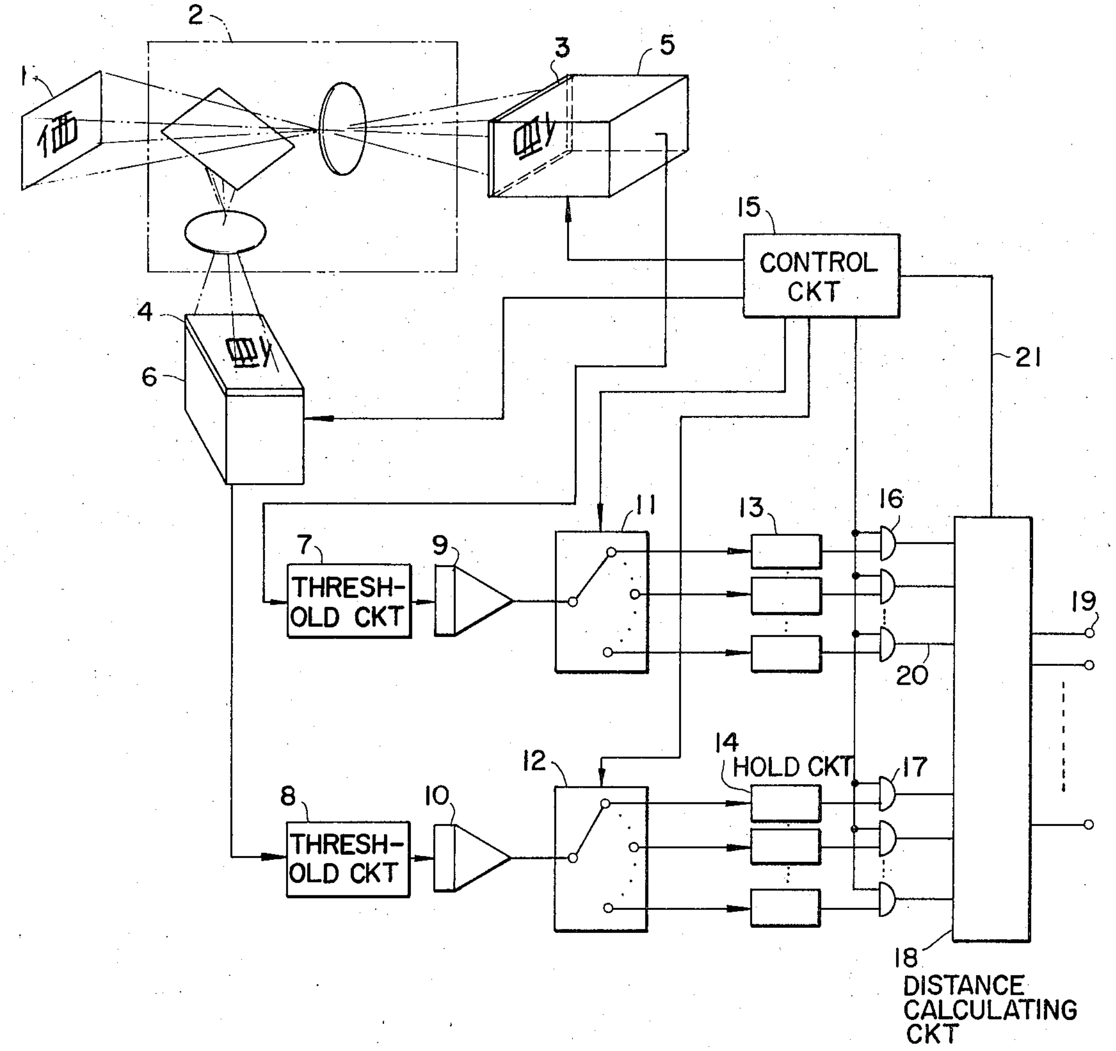
FIG. 2 is a block diagram showing the construction of an embodiment of character recognition apparatus of the present invention.

FIG. 2 is a block diagram showing the construction of an embodiment of the present invention. Referring to the figure, a character printed or typed on paper 1 has its image formed on photoelectric conversion surfaces 3 and 4 by an optical system 2, and is thus converted into electric signals. The photoelectric conversion surfaces 3 and 4 are scanned by a vertical scanning circuit 5 and a horizontal scanning circuit 6, respectively, and the images are derived in the form of electric signals corresponding to the light and dark portions of the character. The scanning type photoelectric conversion device (3, 4, 5 and 6) may take the form of a prior-art conversion device, such as a television pickup tube, or to a prior-art device which is subjected to such design modifications as variation of the number of scanning lines, the scanning speed, etc.

Figure 3A:
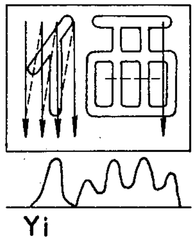
FIGS. 3*a* and 3*b* are illustrative diagrams of scannings for obtaining projection patterns of a character.
Figure 3B:
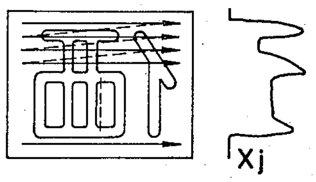

FIG. 3a shows the appearances of the scanning of the Chinese character seen in FIG. 106 in the vertical direction and the vertical projection pattern $Y_i$ thereof, while FIG. 3*b*, shows the appearances of the scanning of the same character in the horizontal direction and the horizontal projection pattern $X_j$ thereof. Although the scanning is conducted in two orthogonal directions in the illustrated embodiment, it should be obvious that two oblique directions can be similarly utilized. Further, an identical surface may be commonly used for the photoelectric conversion surfaces 3 and 4 by addition of an electronic switching circuit, as known.

Referring back to FIG. 2, outputs of the scanning circuits 5 and 6 are respectively shaped by threshold circuits 7 and 8, that is to say, converted to a value of 0 or 1, whereupon the signals are respectively integrated by integrating circuits 9 and 10. The outputs of the integrating circuits 9 and 10 are respectively sampled by sampling circuits 11 and 12 providing connection to a respective terminal at the time of each scanning line, the samples being respectively stored in groups of sample hold circuits 13 and 14. The sampling circuits 11 and 12 have their connections successively changed-over to the next circuit among the groups of hold circuits 13 and 14 every scanning line, respectively. The threshold circuits 7 and 8 effect removal of noises, normalization of densities, etc.

The integrators 9 and 10 are reset immediately after the sampling by the sampling circuits 11 and 12, so that no influence of the preceding scanning may be left therein. The scanning of the scanning circuits 5 and 6, the reset of the integrators 9 and 10, the change-over of the connections of the sampling circuits 11 and 12, and the hold and reset of the groups of hold circuits 13 and 14 are governed by a control circuit 15. Thus, upon completion of the scanning of one picture frame, the projection pattern X on the horizontal axis is spatially stored in the group of sample hold circuits 13, while the projection pattern Y on the vertical axis is spatially stored in the group of sample hold circuits 14.

Although, in the embodiment, the projection patterns are obtained analogically and with respect to the horizontal and vertical axes in parallel, they can also be obtained digitally. Needless to say, it is also possible to obtain these patterns using a single circuit on a time-share basis. In case of obtaining the projection patterns digitally, a sampling circuit and a counter are used instead of the integration circuits 9 and 10. It is also possible that, in lieu of carrying out the scanning of the picture frame, the densities are added spatially in parallel to thus obtain the projection patterns. By dividing the photoelectric conversion surfaces 3 and 4 into a plurality separate lines, it is also possible to process them such that electric charges are progressively increased so as to allow the projection patterns to be directly taken out.

In the embodiment, groups of gate circuits 16 and 17 are opened at the completion of the scanning of one picture frame, and the output projection patterns of the groups of hold circuits 13 and 14 are applied to lines 20, while a pulse indicating scanning completion is applied to a line 21. A recognition code of a character with which the difference between the input pattern and the standard pattern becomes a minimum is supplied to output terminals 19 by means of a distance calculating circuits 18. The details of the distance calculating circuit 18 will now be explained with reference to FIG. 4.

Figure 4:
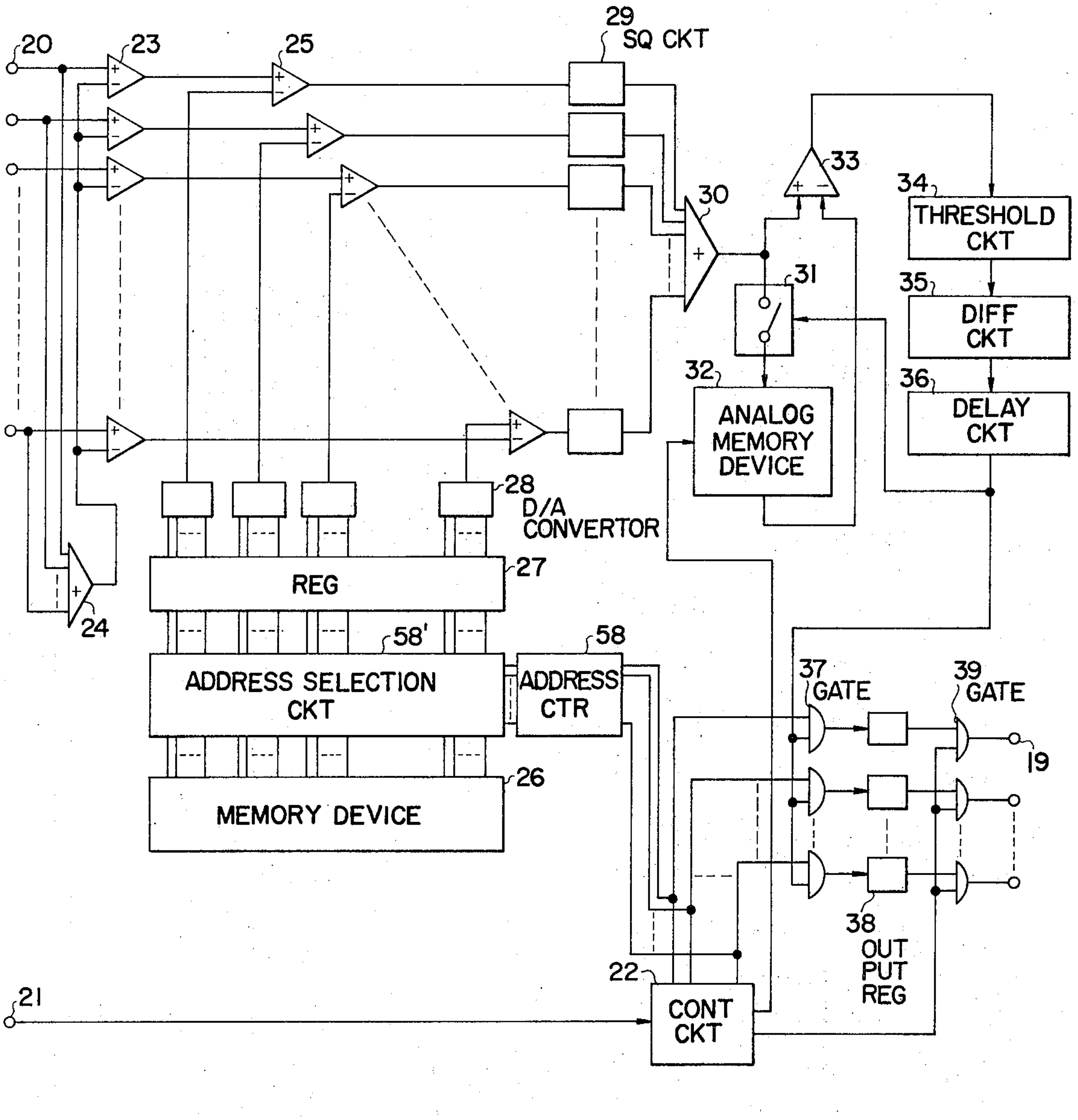
FIG. 4 is block diagram showing the detailed construction of a distance calculating circuit in FIG. 2.

FIG. 4 is a block diagram showing the detailed construction of one embodiment of the distance calculating circuit 18 according to this iventi In the figure, after the completion of one picture or character scan, a control circuit 22 starts operation, by means of pulses received at the input terminal 21, invention. conduct the recognition. Hereinbelow, the projection pattern on the horizontal axis and that on the vertical axis are collectively termed the projection pattern. In actuality, however, the distance calculation is independently carried out for each axis as will be illustrated in FIG. 5.

The projection pattern arriving at the input terminals 20 is applied to one terminal of the corresponding one of a group of substractor circuits 23. On the other hand, the samples of the projection pattern are also added together by an adder circuit 24, whose output is applied to the other terminal of each of the group of subtractor circuits 23. The output of the adder circuit 24 represents the mean value of the inputs due to the fact that the gain of the adder circuit 24 corresponds to the inverse of the number of inputs thereto. As a result, the output of each of the group of subtractor circuits 23 equals the difference between the mean value and the value at the other inputs thereof. If simplification of the circuitry is desired, the subtractor circuits 23 and the adder circuit 24 may be omitted.

The outputs of the group of subtractor circuits 23 are applied to one terminal of a corresponding one of a group of subtractor circuits 25. On the other hand, the vertical and horizontal projection patterns (from which the mean value is subtracted) are previously evaluated for standard characters, and these standard projection patterns are stored in a memory device 26 in the form of digital codes. The control circuit 22 advances a character address counter 58 so that each successive character address at the output of the character address counter 58 is fed to an address selection circuit 58′ and is converted into an address of a location in the memory device 26 where a standard projection pattern corresponding to a standard character is stored. The particular standard projection pattern is read out from the memory device 26, and is stored in a group of registers 27. Outputs of the group of registers 27 are converted into analog signals by means of digital-to-analog converter circuits 28, and are applied to the other terminal of the corresponding one of the group of subtractor circuits 25.

The outputs of the group of subtractor circuits 25 are squared by the corresponding one of a group of square circuits 29, whereupon they are added by an adder circuit 30. If, accordingly, the projection pattern of the input (the horizontal and vertical patterns being put together) is represented as Z and the standard projection pattern as $Z^s$, an output of the adder circuit 30 as appears may be mathematically expressed as follows:

$$R=\sum_{i=1}^{N}(Z_i-Z_i^s-(\bar{Z}-\bar{Z}^s))^2$$

$$=\sum_{i=1}^{N}(Z_i-\bar{Z}-(Z_i^s-\bar{Z}^s))^2$$

Herein, $N$ denotes the number of samples of the projection pattern, $\bar{Z}$ is the means value of $Z$, $\bar{Z}^s$ is the mean value of $Z^s$, and $(Z^s_i - \bar{Z}^s)$ is stored as the standard pattern. The subtraction of the mean values can also be conducted en bloc after the adder circuit 30. At that time, there is utilized the relational equation:

$$R=\sum_{i=1}^{N} (Z_i-Z_i^s-(\bar{Z}-\bar{Z}^s))^2$$

$$=\sum_{i=1} (Z_i-Z_i^s)^2-N(\bar{Z}-\bar{Z}^s)^2$$

In this case, the standard pattern $Z^s_i$ is stored without subtracting the mean value therefrom, while the mean value $\bar{Z}^s$ is separately stored. Such a measure is advantageous in that the group of subtractor circuits 23 can be dispensed with, and all the digital-to-analog converter circuits 28 may have values of only positive polarity.

The output of the adder circuit 30 is the abovementioned value R, and represents the degree of coincidence between the input character and the standard character. The output of the adder circuit 30 is applied via an analog switch 31 to an analog memory device 32. The analog memory device 32 is set at a high level at the beginning of the recognition operation. The difference between the output of the analog memory device that and thab of the adder circuit 30 is obtained by a subtractor 33, and the output of the subtractor 33 is applied to an input of a threshold circuit 34. The polarity of the subtractor 33 is determined such that, when the output of the adder circuit 30 is smaller than that of the analog storage circuit 32, a higher level of output is produced in the threshold circuit 34.

The output of the threshold circuit 34 is differentiated by a differentiation circuit 35, and is thereafter connected to a control terminal of the analog switch 31 via a delay circuit 36. Slightly after the moment at which the output of the adder circuit 30 becomes smaller than that of the analog memory device 32, the output of the delay circuit 36 closes switch 31 and the output R of the adder circuit 30 is accordingly entered into the analog memory device 32 to replace the previous value stored therein. The delay circuit 36 is provided in order to eliminate instability in the rise of the circuit operation.

The output of the delay circuit 36 also gates the outputs of the character address counter 58 by means of a group of gate circuits 37, and feeds them to an output register 38 where the character address is stored. At time intervals sufficient to stably effect the foregoing operations, the control section 22 repeats the stepping of the character address counter 58 and the other operations. Accordingly, each time a lesser value of R is detected at the output of adder circuit 30, it is stored in the analog memory device 32 in place of the previous value, while the character address providing that minimum value of R is stored in the output register 38. Upon repetition of the operations for all of the number of standard characters, the control section 22 stops its operation, generates a termination pulse to open gates 39, and transmits the value of the output register 38, which represents the address of the standard character most closely resembling the input character, to the group of output terminals 19. Although the character addresses are used as recognition codes of characters herein, they can be suitably converted into the recognized characters as may be needed.

From the above explanation taken in conjunction with FIG. 4, it will be understood that the address code of the standard character having a projection pattern being the closest to the input projection pattern is obtained at the output terminals 19 of the distance calculating circuit 18. Although a single recognition code is given in the foregoing embodiment, it is easily modified so as to give a plurality of recognition codes by additionally providing an analog storage circuit or circuits.

Figure 5:
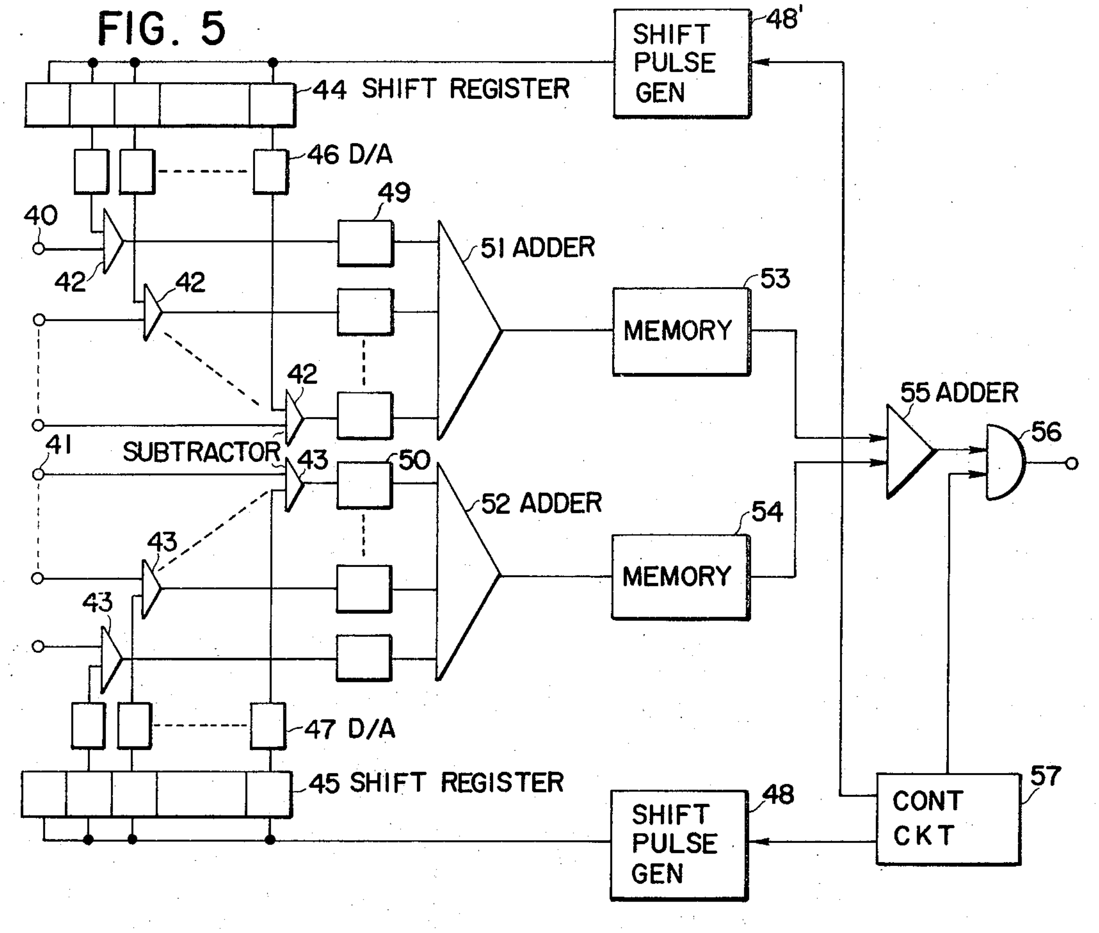
FIG. 5 is a block diagram showing the detailed construction of an ordering circuit in FIG. 2.

FIG. 5 is a block diagram showing a more detailed circuit arrangement of the distance calculating circuit 18, and especially showing a section which has the function of correcting the positional deviation of an input. Groups of input terminals 40 and 41 in FIG. 5 correspond to the group of input terminals 20 in FIG. 4, and the horizontal projection pattern and vertical projection pattern of an input profile arrive at the respective groups. In order to simplify the explanation, the circuits 23 and 24 for calculating the mean value as shown in FIG. 4 are omitted from the drawing.

The projection patterns arriving at the groups of the input terminals 40 and 41 are introduced to one terminal of the corresponding one of two groups of subtractor circuits 42 and 43. There is applied to the other terminal of each of the group of subtractor circuits 42 or 43 an output of a shift register 44 or 45 subsequent to being converted into an analog signal by means of a group of digital-to-analog converter circuits 46 or 47. The shift registers 44 and 45 correspond to the register 27 in FIG. 4, and the horizontal projection patterns and vertical projection patterns of standard characters are stored therein. Although, in FIG. 5, the device is illustrated for the sake of simplicity as if it were a 1-bit shift register, it should be obvious that several bits are required in actuality.

Although the standard projection patterns are read out from the memory device 26 to the shift registers 44 and 45 by the actions of the control circuit 22, the character address counter 58 and the address selection mechanism 58', as illustrated in FIG. 4, these elements are omitted in FIG. 5 for simplicity of description. The shift registers 44 and 45 are sequentially shifted by means of shift pulse generator circuits 48' and 48, respectively. Outputs of the groups of subtractor circuits 42 and 43 are squared by groups of square circuits 49 and 50, and are thereafter added by adder circuits 51 and 52, respectively. Accordingly, differences when the position of the standard pattern is shifted are calculated in succession and appear at the outputs of the adder circuits 51 and 52.

Among the outputs of the adder circuits 51 and 52, the minimum values of the differences are stored by minimum-value memory circuits 53 and 54, respectively. It will be easily understood that the minimum-value memory circuits 53 and 54 are constructed similarly to the minimum-value selection circuit which is composed of the analog switch 31, the analog storage circuit 32, the subtractor circuit 33, the threshold circuit 34, the differentiation circuit 35, the delay circuit 36, etc., in FIG. 4. The minimum values of the differences of the horizontal projection pattern and the differences of the vertical projection pattern are independently obtained in the minimum-value storage circuits 53 and 54, respectively. The minimum values are added by an adder circuit 55, to be thereafter taken out to the outside by a gate circuit 56.

The control circuit 57 has the functions of controlling the shift pulse generator circuits 48 and 48' to control the shifts, the opening of the gate circuit 56 after completion of the shifts to transmit the output to the outside, the subsequent resetting of the minimum-value selection circuits 53 and 54, and so forth. The initiation of the operation of the control circuit 57 is controlled by the control circuit 22. The output of the gate circuit 56 is used in place of the output of the adder circuit 30 in FIG. 4, and is connected to the analog switch 31 and the subtractor circuit 33. The subsequent operations are the same as in FIG. 4.

The shift registers 44 and 45 may be provided as bidirectional shift registers. More simply, however, the standard pattern is set with a previous deviation towards the left side, and is gradually shifted towards the right side. Although, at this time, excessive register parts are required on the left side, superfluous parts on the right side may be discarded.

When the input projection pattern is converted to digital form, an8 the calculation is digitally carried out, it is also possible to shift the input projection pattern. According to the embodiment described, even for a positional deviation of a character, the standard pattern is moved to find a position at which the difference becomes a minimum, and to perform the recognition with the difference at the position, so that the embodiment is very effective for compensating for positional deviation. In addition, even if the input is independently moved in both the horizontal and vertical directions, no influence is exerted by one movement on the other, so that the apparatus becomes simple and a high speed processing is possible with parallel calculation. A character recognition apparatus having such advantages can be easily realized in practice.

Description will now be made of the results of the character recognition owing to the above embodiment. Assuming that the resolution for detecting characters is 50 meshes for each of the horizontal and vertical directions, the number of picture elements is 2,500. If it is intended to recognize approximately 1,000 characters among Daily Use Chinese Characters (established in Japan) by the conventional pattern matching method, $2.5 \times 10^6$ bits are required as the capacity of the standard pattern memory device 26, it being supposed that one picture element is represented by the two levels of black and white or one bit. In contrast, according to the embodiment described, the projection pattern is made up of a total of 100 samples, counting both the horizontal and vertical directions. One sample requires only 6 bits, and hence, 600 bits are required for one character. In the case of 1,000 characters, the standard pattern memory may be $0.6 \times 10^6$ bits, which is less than one-fourth previously required.

As regards the number of circuits used for the matching calculation, the conventional pattern matching method requires 2,500 logical product circuits and adder circuits for the outputs thereof, which are very difficult to realize in practice due to the vast number of elements required, the complexity of writing, etc. In contrast, according to the disclosed embodiment of the present invention, the apparatus is constituted of only several hundreds of adder circuits, square circuits, etc. Since these circuits conduct calculations at a precision in the order of 6 bits, they may satisfactorily be inexpensive elements. Thus, the apparatus can be constructed in a small size, in a simple way and at a low cost.

Further, considering movements of the characters, if it is supposed that at most deviations of two elements are respectively allowed in the vertical and horizontal directions, the conventional pattern matching method effects movements 5 times in total in the vertical direction and 5 times in total in the horizontal direction, and effects calculations for their combination. Therefore, calculations amounting in total to $5 \times 5 = 25$ times should be conducted. In addition, $50 \times 50$ two-dimensional shift registers are required. The realization of such a system is therefore almost impossible.

In contrast, in conformity with the disclosed embodiment of the invention, since the movement in the vertical direction and the movement in the horizontal direction are independent, the number of different calculations may be limited to $5 + 5 = 10$ times. Moreover, if the horizontal and vertical directions are subjected to parallel calculations, the period of time for 5 calculations is sufficient. In addition, the shift registers are easily realizable ones of 6 bits — 50 stages $\times$ 2 or so.

As regards the recognition precision, when the resolution was made with the above-mentioned $50 \times 50$ meshes and preliminary experiments were carried out for Educational Chinese Characters, 881 characters (established in Japan), a percentage of recognition of 96 percent was obtained by the invention without the positional-deviation correction, and a percentage of recognition of 99.4 percent was obtained with the positional-deviation correction. There has been accordingly provided recognition apparatus which can be satisfactorily put into practice without the disadvantages previously inherent in the prior art.

The following table illustrated in FIG. 11 lists results in the case where, for the examples of input characters (seven characters) set forth in the left column, differences from standard characters are calculated with the positional-deviation corrections by means of the apparatus of the foregoing embodiment, and they are arranged in the order of smaller differences. Numerals under the respective Chinese characters indicate values of the differences. As apparent from the table, the erroneous character is that seen in FIG. 10*c*, which exhibits the smallest difference for an input character as seen in FIG. 10*d* but the correct character as seen in FIG. 10*d* is positioned in the second column position. According to experiments, a character of correct recognition was always included within 5 characters arranged in the order of smaller differences.

Accordingly, in the case where a particularly high percentage of recognition is requested, a correct solution can be determined such that several probable characters are first selected by the recognition apparatus according to the present invention, and thereafter a more precise analysis is performed in connection with those selected characters. Alternatively, only when a recognized result by the recognition apparatus according to the present invention is uncertain, that is, only when the minumum value of difference is considerably large, recognition by a precise recognition apparatus at the subsequent stage is performed. With such measures, it is possible to relieve the burden of the recognition apparatus at the subsequent stage. If, in this case, the positional deviation is previously corrected by the use of the recognition apparatus of the present invention, movements of character patterns advantageously become unnecessary in the recognition apparatus at the subsequent stage.

FIGS. 6 to 9 show another embodiment of the present invention. The embodiment is constructed as described above such that rough recognition is once conducted for an input character by means of the apparatus of the present invention, next a group of standard characters in which a correct solution is included is selected, and then precise recognition is conducted for the selected characters. It is especially effective in cases where there are a number of different kinds of characters to-be-recognized, and where a high recognition speed is to be maintained.

In this embodiment, the calculation of the foregoing distance R is not executed, but the calculation is discontinued after completion of part thereof, and an intermediate result is obtained. Preliminary recognition is conducted using the intermediate result, to obtain a small number of probable correct-solution characters. The final discrimination is conducted by performing the remaining calculation for the probable characters. A reduction of the calculating period is therefore made possible. With this embodiment, the calculating period can be reduced by approximately one-half employing only the component $R_X$ or $R_Y$. There can be further employed, for example, the summation in equation (5) or (6) as discontinued half-way, the summation being taken every second term, or the like.

Figure 7:
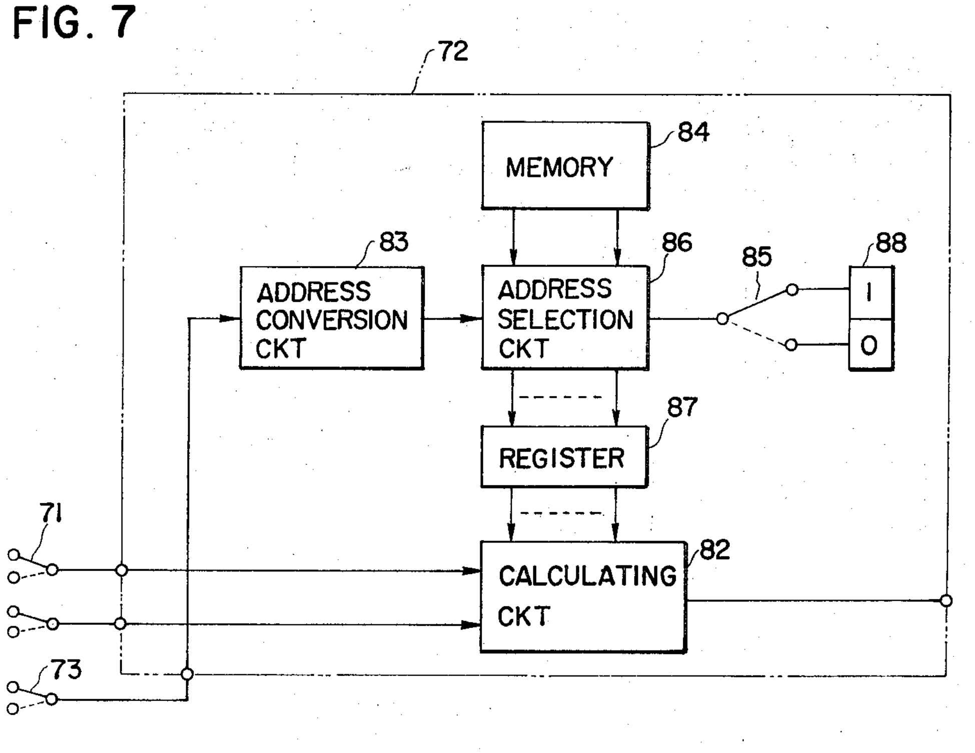
FIG. 7 is a block diagram showing the construction of a distance calculating circuit in FIG. 6.
Figure 6:
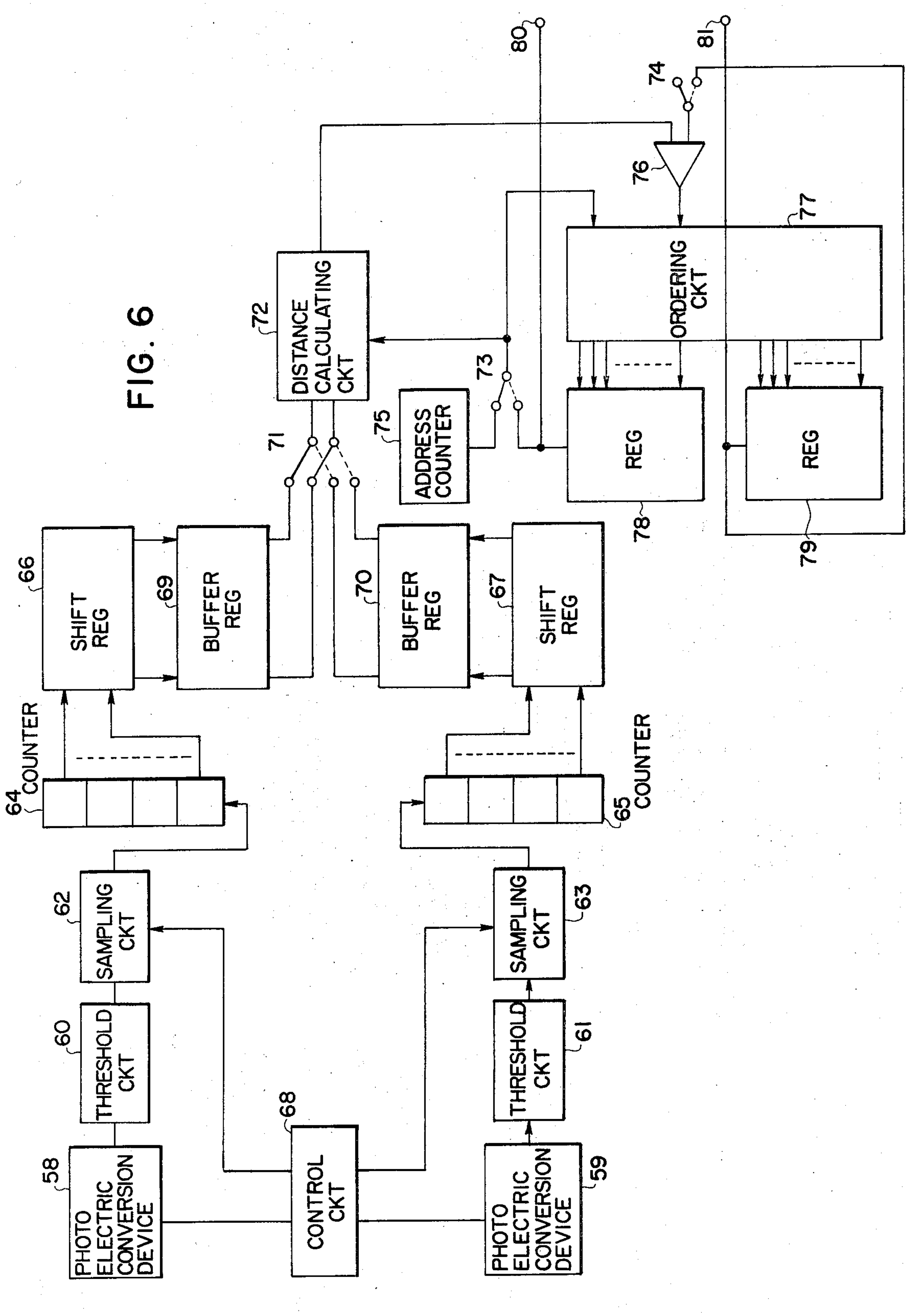
FIG. 6 is a block diagram showing the construction of another embodiment of the character recognition apparatus of the present invention.
Figure 8:
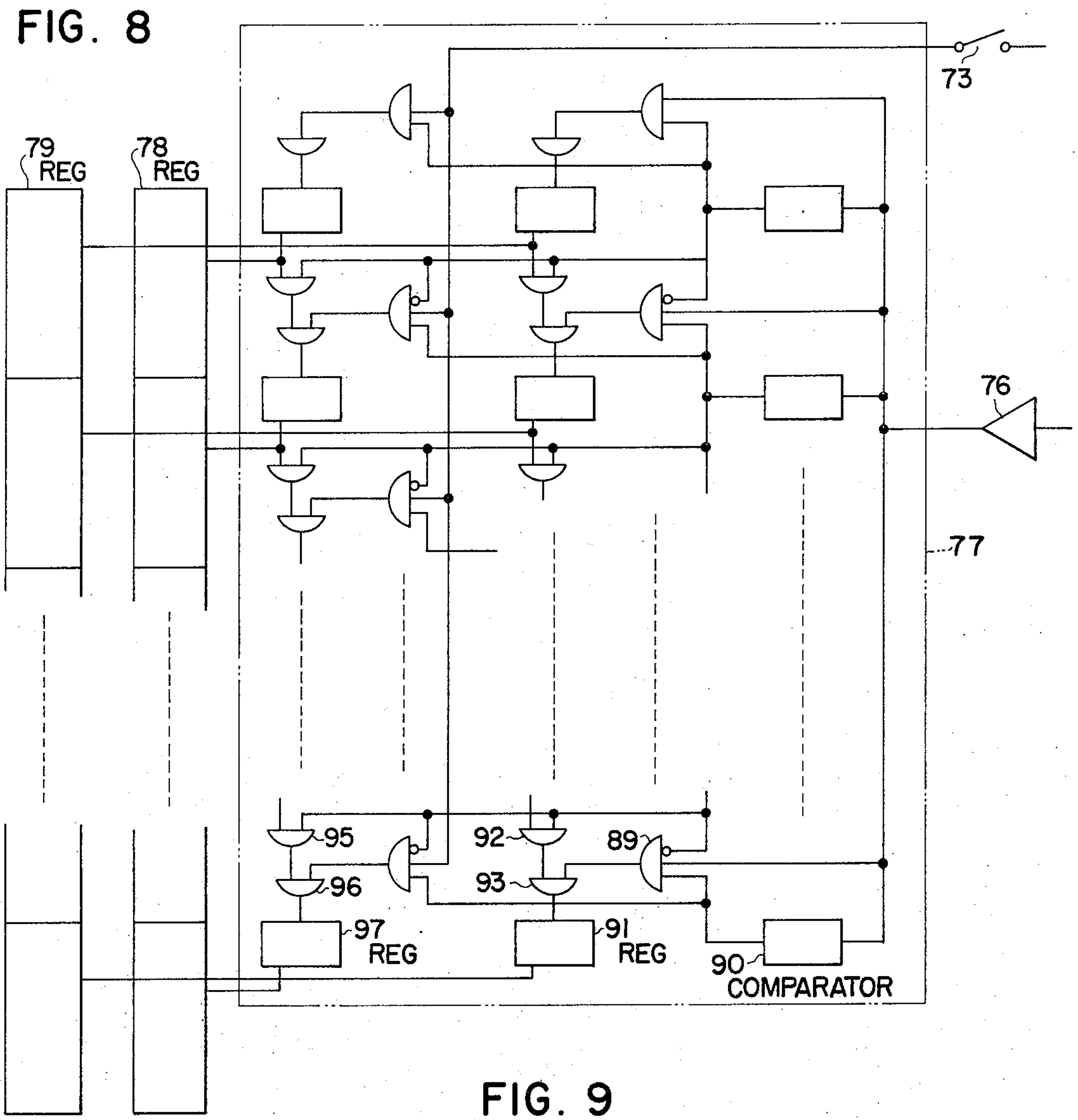
FIG. 8 is a block diagram showing the construction of an ordering circuit in FIG. 6.

The embodiment of FIGS. 6 – 8 is constituted of digital circuitry. Outputs of photoelectric conversion devices 58 and 59 are respectively coded into binary values by threshold circuits 60 and 61, and are respectively sampled by sampling circuits 62 and 63 every fixed period, to provide trains of pulses. The pulse trains are respectively counted by counters 64 and 65. Since the counters 64 and 65 are reset immediately before initiation of scanning, values proportional to black portions of a character image scanned by the particular scanning line are obtained at the termination of scanning. The counted values in the counters 64 and 65 are successively shifted to shift registers 66 and 67 at the time of termination of the scanning line, respectively. Accordingly, patterns with density distributions on the respective scanning lines projected onto straight lines orthogonal to the scanning lines are obtained in the shift registers 66 and 67 at the time of termination of all the scannings of one character frame. It is apparent that the number of stages of each shift register 66 or 67 need be equal to the number of scanning lines, and that the number of digits of each stage may be the logarithmic value of the number of sampling points within a scanning line with a base of 2.

A control circuit 68 controls the scanning of the photoelectric conversion devices 58 and 59, the timing of sampling of the sampling circuits 62 and 63, the counting as well as resetting of the counters 64 and 65, the writing of data into the shift registers 66 and 67, and so forth. At the time of completion of the scanning of the character of the contents of the shift registers 66 and 67 are shifted to buffer registers 69 and 70, respectively. Outputs o the buffer registers 69 and 70 are changed-over by a switch 71, to be connected to a distance calculating circuit 72. Switches 71, 73 and 74 are interlocked. When all these switches are thrown to the upper side of the drawing, an output of a character address counter 75 is also connected to the distance calculating circuit 72 via the switch 73, and an output of the distance calculating circuit 72 is connected to an ordering circuit 77 via an adder 76. The other signal to be applied to the adder 76 is kept at zero, since the switch 74 is thrown to the upper side. On the other hand, an output of the switch 73 is also connected to the ordering circuit 77. For the case where the switches 71, 73 and 74 are thrown to the lower side drawing, the srawing, description will be made hereinafter.

The distance calculating circuit 72 serves to evaluate the distance between the projection pattern of standard character of a character address imparted to the input and the projection pattern of an input character. The character address counter 75 is reset immediately before initiation of the character recognition operation, and is progressively stepped forward by instructions of the control circuit 68. The distances between the vertical projection pattern of the input character and the vertical projection of the standard characters are therefore obtained sequentially in the order of the character addresses of the standard characters at the output of the distance calculating circuit 72. The distance values and the character addresses are rearranged in the order of the smaller distances by the ordering circuit 77. The operations of the distance calculating circuit 72 and the ordering circuit 77 will now be described in detail.

FIG. 7 is a block diagram showing the construction of the distance calculating circuit 72. The projection pattern of the input character is applied to the input of a difference-square-sum (sum-of-squares-of-differences) calculating circuit 82 via the switch 71. A character address code having arrived via the switch 73 is converted into an address of a storage location in memory device 84 by an address converter circuit 83. The converted address is the address of the storage location at which the standard projection pattern of a standard character corresponding to the character address is stored. A switch 85 is opened and closed in interlocking relationship with the switches 71 and 73, and when it is thrown to the upper side, a logical signal 1 is transmitted to an address selection circuit 86. At this time, the address selection circuit 86 reads out a series of standard projection pattern information from the above-mentioned address into a register 87, and since the signal having arrived from the switch 85 is 1, the address selection circuit 86 is adapted to output the vertical projection patterns to the register 87 in conformity with the instructions. As will be referred to hereinbelow, when the switch 85 is thrown to the lower side, the horizontal projection patterns are read out.

Outputs of the register 87 are applied to the other input of the distance calculating circuit 82. The distance between the input projection pattern and each standard projection pattern (in this case, both being the vertical projection patterns) is calculated by the distance calculating circuit 82, and is fed to the output thereof. Herein, as has been stated with reference to FIG. 5, a shift register is used for the register 87, the standard projection patterns are successively moved in the shift register, and a distance value at a position at which the distance from the input projection pattern is the smallest is read out as the distance between the patterns. Then, a distance calculation, with the positional deviation of the character pattern at its input corrected, is possible, and a more precise distance calculation is possible.

FIG. 8 is a block diagram showing the detailed construction of the ordering circuit 77. In this figure, the registers 78, 79, the adder 76, and the switch 73 being the same as in FIG. 6 are illustrated again. An output of the adder 76 is applied to a group of gate circuits 89, and is simultaneously applied to a group of comparator circuits 90. Another input of each comparator circuit 90 is coupled with the output of the corresponding one of a group of registers 91. The circuitry is connected such that, when the distance values which are received at the respective inputs of the group of comparator circuits 90 become larger than values stored in the corresponding ones of the group of registers 91, the signal 1 appears at the respective outputs of the group of comparator circuits 90.

Let it be supposed that the values stored in the group of register circuits 91 are regularly arrayed such that the upper register as viewed in the figure has the smaller value, the lower register having the larger value. Then, below a point at which, when the contents of the group of registers 91 are successively examined from the uppermost register, the content value of the register becomes larger than the input value for the first time, all the outputs of the group of comparators 90 becomes 1. The outputs 1 among the group of comparators 90 open a group of gate circuits 92, and through a group of OR gate circuits 93, the lower side of the group of register circuits 91 constitute a shift register. On the other hand, the respectively adjacent outputs of the group of comparator circuits 90 are connected to the group of AND gate circuits 89. Each of the group of AND gate circuits 89 is constructed so as to be opened only when the upper one of the two adjacent circuits among the group of comparator circuits 90 is 0, and the lower one is 1.

At this time, the output of the adder 76 is applied to any one of the group of OR gate circuits 93 through any opened one of the group of AND gate circuits 89, and is further applied to the input of any one of the group of registers 91. Accordingly, the lower side of the group of register circuits 91 constitutes the shift register with the boundary at any one of the register circuits, and the output of the adder 76 is applied to the input of the constituted shift register. Upon instructions from the control section 68 (although, for the sake of simplicity, the control section 68 and its wirings to the respective circuits are omitted in FIG. 8, they will be easily understood), the shift register effects the shift action by one stage, and reads the output of the adder 76 into one stage thereof. Thus, the output of the adder 76 is put into the position corresponding to the order of magnitude among the group of registers 91, the positional movement in the group of registers 91 as is necessary therefor is performed, and one digit component from the lowermost stage of the group of registers 91 is forced out and discarded.

A very large value is set in the group of registers 91 by the instructions of the control section 68 prior to the character recognition operation, whereby the distances are arranged in the group of registers 91 in the order of smaller ones each time the character address is advanced. Groups of AND gate circuits 94, 95, a group of OR gate circuits 96, and a group of registers 97 effect operations corresponding to those of the groups of AND gate circuits 89, 92, the group of OR gate circuits 93, and the group of registers 91, respectively, and the only difference is that their inputs are character address codes arriving from the switch 73. The control of the movements of the group of registers 97 is also effected by the group of comparator circuits 90. The character address codes are accordingly arranged in the group of registers 97 in the order of the smaller distances.

It has been made apparent by the description with reference to FIG. 7 and FIG. 8 that the standard character addresses arranged in the order of the smaller distances from the vertical projection pattern of the input character are stored in the shift register 97, while the distances are stored in the shift register 91. The character address counter 75 is progressively stepped forward and the operations are completed for all the character addresses, whereupon outputs of the groups of registers 91 and 97 are respectively moved to the shift registers 79 and 78 by the instructions of the control section 68. After the completion of the movements, the character addresses of the standard characters selected in dependence upon the distances of the vertical projection patterns are arranged in the shift register 78 in the order of the smaller distances, while the values of the distances at that time are arranged in the shift register 79.

Referring back to FIG. 6, after the completion of the calculations with the vertical projection patterns, the switches 71, 73 and 74 and the switch 85 in FIG. 7 are changed-over to the lower side by the instructions of the control section 68. The distance calculating circuit 72 is accordingly supplied with the horizontal projection pattern of the input character through the switch 71, and with the output of the shift register 78 through the switch 73. The distance calculating circuit 72 evaluates the distances between the horizontal projection pattern of the input character and the horizontal projection patterns of the standard characters, and feed them to its output in succession by an operation similar to that previously stated. In contrast to the previous operation, the calculation need not be conducted for all the character addresses, but it may be performed only for the standard characters of the character addresses stored in the shift register 78. This may be done such that the distances are evaluated by sequentially moving the shift register 78. Since the switch 85 is thrown to the lower side in FIG. 7, the horizontal projection pattern is read out and used for the projection pattern of the standard character. Since the switch 74 is thrown to the lower side in FIG. 6, the adder 76 adds the distance between the horizontal projection patterns obtained in the distance calculating circuit 72 and the distance between the vertical projection patterns stored in the shift register 79, and supplies the added result to the ordering circuit 77. Consequently, the sums between the distances between the horizontal projection patterns and the distances between the vertical projection patterns are arranged in the group of registers 91 in FIG. 8 in the order of the smaller values, while the character addresses corresponding to the sums of the distances are arranged in the group of registers 97.

After the calculation is completed for all the character addresses stored in the shift register 78, the contents of the groups of registers 91 and 97 are respectively moved to the shift registers 79 and 78. Outputs of the shift registers 78 and 79 are respectively fed to output terminals 80 and 81. Since the output of the uppermost stage of the shift register 78 is the code of the character address which has the standard projection pattern which is the closest to the input projection pattern, the character address can be used as the recognized result of the input character. Further, when said stage is used as the first stage of the so-called multistage recognition apparatus wherein a small number of character addresses are out-putted in the order of the smaller distances and wherein recognition of a more precise analysis is carried out for characters of the character addresses, the outputs of the upper several stages of the shift register 78 may be sequentially transmitted for such use. The distance value fed to the output terminal 81 can be utilized as an index indicating the probability of recognition. For example, it is possible that, if the distance value is larger than a certain threshold level, the recognized result is rejected.

It is apparent from the above description that, since the embodiment first selects a small number of probable characters for the recognized result by the use of the vertical projection patterns and effects recognition among them by the use of also the horizontal projection patterns, the period of time required for the recognition is shortened approximately to half.

Experimental results with the above embodiment will now be explained. The object characters were Educational Chinese Characters, 881 characters, 50 × 50 meshes were adopted for the resolution, and the density was shaped into either of the two levels of black and white at each mesh spot. The vertical and horizontal projection patterns were previously measured and stored for all the 881 standard characters. Next, a character optionally selected from among the 881 characters was inputted anew, to obtain the projection pattern thereof. A small number of standard characters were selected and arranged in the order of the smaller distances of the vertical projection patterns. Herein, as regards the distances of the vertical projection patterns, the distances are measured in such a manner that the vertical projection pattern of the input character was moved within 1 mesh in the forward and backward directions, and the minimum values among the measured values were made to respective distances. The experiment was repeated a number of times, and the probability at which the correct solution is not included in the selected characters was obtained.

Figure 9:
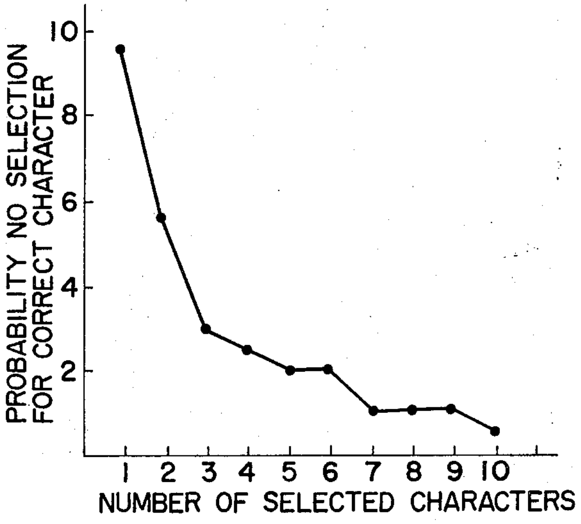
FIG. 9 is a graph showing results of the rate of recognition in recognition experiments of Chinese characters with the embodiment illustrated in FIG. 6.

It is known that the rate of correct solution when the vertical projection pattern and the horizontal projection pattern are jointly used is extremely high, and that there is almost no erroneous recognition. If, therefore, the correct solution character is included in the recognition object characters selected using the vertical projection patterns, the input character can be recognized with almost no failure. In other words, the probability at which the correct solution is not included in the selected characters can be considered as the rate of misrecognition. FIG. 9 is a graph showing variations in the probability at which the correct solution was not selected, i.e., the rate of mis-recognition, when the foregoing experiments were carried out for each of 189 different characters and when the number of the selected standard characters was changed. It is understood from the graph that while the rate of mis-recognition becomes 0.5 percent at the number of selections of 10, it is also 0.5 percent when both the hori-zontal projection pattern and the vertical projection pattern are used, so that the number of selections of 10 is sufficient. Recognition with only the vertical projection pattern corresponds to the case where the number of selections is made 1, and it is also understood that the recognition scarcely has a practical value since the rate of misrecognition at this time becomes approximately 9.6 percent.

Since, accordingly, 10 or so is satisfactory for the number of standard characters selected by the use of the vertical projection patterns, the period of time for calculating the distances of the horizontal projection patterns are substantially negligible. As a result, the calculating period may be almost a half in comparison with that of the case of using both the vertical and horizontal projection patterns. Although the reduction of the calculating period to half can also be realized by providing the distance calculating circuits separately for the vertical projection patterns and the horizontal projection patterns, the two distance calculating circuits are required in this case. In contrast, the case of the present invention has a distinctive feature that the calculating period is reduced to half even with the single distance calculating circuit.

What is claimed is:

1. Character recognition apparatus comprising:

means for projecting the density distribution of an unknown input pattern taken along at least two intersecting axes of the pattern to obtain at least two input projection patterns, memory means for storing predetermined standard patterns in the form of the standard projection patterns thereof taken along the same axes as the unknown input pattern, distance calculating circuit means for comparing the standard projection patterns stored in said memory means sequentially with at least one input projection pattern related to the density of a character along a selected projection axis to evaluate the degree of similarity between said unknown input pattern and each of said standard patterns, including selection circuit means for selecting the standard pattern having the maximum degree of similarity corresponding to the unknown input pattern, and output circuit means responsive to said selection circuit means for providing identification of the corresponding standard pattern as a recognized output, including means for decomposing said unknown input pattern into a plurality of meshes, means for generating signals corresponding to each mesh, means for quantizing said signals into binary signals and means for accumulating said binary signals in a predetermined direction.

2. Character recognition apparatus as defined in claim 1 wherein said distance calculating circuit means further includes shift register means connected to said memory means for sequentially storing each standard pattern signal obtained from said memory device corresponding to said selected projection axis and control means for shifting the position of said standard pattern signal in said shift register means.

3. Character recognition apparatus as defined in claim 2 wherein said distance calculating circuit means further includes comparison means for measuring the degree of similarity between each standard projection pattern stored in said shift register means and said input projection pattern.

4. Character recognition apparatus comprising:

means for projecting the density distribution of an unknown input pattern taken along at least two intersecting axes of the pattern to obtain at least two input projection patterns, memory means for storing predetermined standard patterns in the form of the standard projection patterns thereof taken along the same axes as the unknown input pattern, distance calculating circuit means for comparing the standard projection patterns stored in said memory means sequentially with at least one input projection pattern related to a selected projection axis to evaluate the degree of similarity between said unknown input pattern and each of said standard patterns, including selection circuit means for selecting the standard pattern having the maximum degree of similarity corresponding to the unknown input pattern, and output circuit means responsive to said selection circuit means for providing identification of the corresponding standard pattern as a recognized output, wherein said comparison means includes a plurality of subtractor circuits each having a first input receiving signals of said input projection pattern and a second input connected to said shift register means, a plurality of squaring circuits connected to said subtractor circuits for squaring the outputs thereof, and an adder circuit for adding the outputs of said squaring circuits so as to produce a signal value equal to the sums of the squares of the differences between said input projection and each standard projection pattern, wherein said distance calculating circuit means further includes shift register means connected to said memory means for sequentially storing each standard pattern signal obtained from said memory device corresponding to said selected projection axis and control means for shifting the position of said standard pattern signal in said shift register means, wherein said distance calculating circuit means further includes comparison means for measuring the degree of similarity between each standard projection pattern stored in said shift register means and said input projection pattern.

5. Character recognition apparatus as defined in claim 4 wherein said selection circuit means includes means for storing the minimum value of the output of said adder circuit and said output circuit means includes output means connected to said memory means and said selection circuit means for storing the identity of the standard pattern corresponding to said stored minimum value.

6. Character recognition apparatus as defined in claim 5 wherein said selection circuit means includes a subtractor circuit having one input connected to the output of said adder circuit, an analog memory circuit having an output connected to a second input of said subtractor circuit, a selectively operable switch for connecting the output of said adder circuit to the input of said analog memory circuit, and switch operating means for operating said switch in response to the output of said subtractor circuit when the output of said adder circuit is less than the value stored in said analog memory circuit, thereby replacing the value stored in said analog memory circuit with the output of said adder circuit.

7. Character recognition apparatus as defined in claim 6 wherein said switch operating means includes a threshold circuit connected to the output of said subtractor circuit for providing an output when the output of said subtractor circuit exceeds a fixed value, a differentiation circuit connected to the output of said threshold circuit, and a delay circuit connected to the output of said differentiation circuit and said switch.

8. Character recognition apparatus as defined in claim 7 wherein said output means includes a plurality of address registers, a plurality of gates selectively connecting said address registers to said memory means and being actuated by the output of said delay circuit.

9. Character recognition apparatus as defined in claim 3 wherein said comparison means includes means for producing a signal value equal to the sums of the squares of the differences between said input protection pattern and each standard projection pattern.

10. Character recognition apparatus as defined in claim 3 wherein said axes on which said input pattern is projected are orthogonally intersecting axes.

11. Character recognition apparatus as defined in claim 3 wherein said means for projecting the density distribution of said input pattern comprises a scanning type photoelectric conversion pickup tube, an integrator circuit connected to the output of said pickup tube, a sampling circuit for sampling the output of said integrator circuit each horizontal scanning period of said pickup tube, and a sample hold circuit for storing the sampled signals for a fixed period of time.

12. Character recognition apparatus comprising:

means for projecting the density distribution of an unknown input pattern taken along at least two intersecting axes of the pattern to obtain at least two input projection patterns, memory means for storing predetermined standard patterns in the form of the standard projection patterns thereof taken along the same axes as the unknown input pattern, distance calculating circuit means for comparing the standard projection patterns stored in said memory means sequentially with at least one input projection pattern related to a selected projection axis to evaluate the degree of similarity between said unknown input pattern and each of said standard patterns, including selection circuit means for selecting the standard pattern having the maximum degree of similarity corresponding to the unknown input pattern, and output circuit means responsive to said selection circuit means for providing identification of the corresponding standard pattern as a recognized output, wherein said distance calculating circuit means comprises switch circuit means for selecting one of the two input projection patterns, calculating circuit means connected to said switch circuit means for calculating the degree of similarity between the selected input projection pattern, ordering circuit means for rearranging the standard patterns in the order of the higher degrees of similarity in said calculating circuit means, and first and second register means for storing character addresses and degrees of similarity of said rearranged standard patterns.

13. Character recognition apparatus as defined in claim 12 wherein the two input projection patterns are horizontal and vertical projection patterns.

14. Character recognition apparatus as defined in claim 12 wherein said distance calculating circuit means further includes address converter circuit means for converting the addresses of characters into address signals for said memory means in which the standard projection patterns of said characters are stored, logical code adder circuit means for selecting the projection axis of said standard projection patterns, address selection circuit means for selecting the standard pattern information of said memory means by outputs of said address converter circuit means and said code adder circuit means, register means for recording the selected standard pattern information and comparison circuit means for calculating degrees of similarity between outputs successively read out from said register means and said input projection pattern.

15. Character recognition apparatus as defined in claim 14 wherein said degree of similarity calculated by said distance calculating circuit is determined by values of sums of squares of differences between said input projection pattern and said standard projection pattern, and wherein said calculating circuit means for evaluating said degree of similarity comprises a plurality of subtractor circuits for evaluating said difference between said two patterns, a plurality of square circuits for squaring the outputs of said subtractor circuits, and a circuit for adding the squared values.

16. Character recognition apparatus as defined in claim 14 wherein said register means is composed of a shift register means and wherein said standard pattern information of the specific characters read out from said memory means are sequentially moved within said shift register to make corrections of position of the data stored therein.

* * * * *